May 3, 1960

S. S. FISHMAN 2,935,579

ELECTRICAL SWITCH

Filed June 9, 1958

INVENTOR

Sherman S. Fishman

May 3, 1960     S. S. FISHMAN     2,935,579
ELECTRICAL SWITCH

Filed June 9, 1958     2 Sheets-Sheet 2

INVENTOR
Sherman S. Fishman

United States Patent Office 2,935,579
Patented May 3, 1960

2,935,579

ELECTRICAL SWITCH

Sherman S. Fishman, San Francisco, Calif., assignor of twenty-five percent to Sayles St. Sales Co., San Francisco, Calif., a proprietorship of California Application June 9, 1958, Serial No. 740,612

3 Claims. (Cl. 200—33)

This invention relates to electrical switches and in particular to a new type of switch mechanism employing electrically conducting small particulates which have free flow properties. Conventionally, an electric switch comprises a pair of electrodes which are short-circuited by a mechanical movement or by immersion in liquid mercury. The electrodes are enclosed in a non-conducting capsule and filled with an inert gas or enclosed in a grounded housing and mounted in air. The use of the mercury switch is limited by the freezing point (40° C. below zero) and the boiling point (360° C. above zero) of mercury. It becomes inoperative as the temperature approaches the freezing point and also fails as the boiling point is approached where the mercury will vaporize. The temperatures which are encountered in and above the earth's atmosphere as they have been reported in the International Geophysical Year 1958 clearly indicate that electrical switches operable under these conditions are needed. As an example, balloon flights have encountered temperatures of 70° C. below zero at altitudes of 65,000 feet. Measurements of temperatures on the moon have been estimated at 135° C. above zero on the sunlit side and 153° C. below zero on the dark side. Estimates of temperatures on the planets report the polar cap of Mars at 70° C. below zero and on the surface of the planet Venus at 40° C. below zero.

This invention is primarily concerned with the switching of electrical supplies at extreme high and low temperatures as well as being operative within this range, incorporating a quick or rapid switching action and a time delayed switching action. The device embodies a combination of the sand timer principle and the short-circuiting principle common to all electrical switches. As an example, the switch for delayed timing consists of a non-conducting enclosure (glass, ceramic, pyroceram) having a double chamber with a calibrated apperture connecting them. The switch for rapid action consists of a single chamber capsule. The electrodes are distributed in such a way that the short-circuiting will occur immediately or following a pre-determined time delay. The particulates are composed of electrically conducting metals such as copper, silver, gold, platinum, aluminum, columbium, tantalum, tungsten, magnesium, zirconium, beryllium, vanadium, and the like. The particulates alternatively may be composed of non-conducting supporting material such as silica, glass, plastic, ceramic and the like which have been individually treated so that the surface becomes electrically conducting. This arrangement by the free flowing properties of these particulates will serve to short-circuit the electrodes by intimate contact of each particle with each other and the close contact of the particulates about the electrodes. Additionally, the many small points of contact about the electrode serves to suppress electrical arcing. In most cases the temperature extremes required will determine the material from which the particulate is prepared. The enclosure can be evacuated to remove air and water vapor and if it is desired the capsule can be filled with an inert gas. As an example, helium may be selected because of its use in detecting leakage by means of sensitive helium detecting instruments. In the case of low temperatures such as would be experienced in the polar regions and at great altitudes, the principle of superconductivity acts to decrease the electrical resistance of the particulates and makes for a more efficient electrical switch. As an example, free flowing particulates of copper shaped so that there is a minimum of friction between the particles and having a diameter in the range of 200 to 500 microns were put in a single chamber glass capsule having two electrodes on one end. The capsule was filled with dry air (so that no ice could form on the particulates) and the capsule was sealed. This switch was immersed in liquid nitrogen for several minutes. Upon removal it was observed that the particulates were free flowing and the switch was used to control an electric light bulb.

Accordingly, it is the main object of this invention to provide an electric switch using particulates in a non-conducting enclosure of single or multiple chambers. These particles may be referred to herein as meticulates, micro-meticulates, metalicules, micro-metalicules or sphericules.

It is a further object of this invention to provide an operating electric switch with good reliability in excess of 200° C. below zero and about 1000° C. above zero.

It is a further object of this invention to provide an electric switch with electrodes so distributed that a pre-determined time delay will occur.

It is yet a further objective of this invention to provide sphericules which have flow properties approaching that of a liquid and as a practical matter can be used in this instance as an inexpensive substitute for a liquid metal such as mercury.

The above and still further objects and advantages of the present invention will become apparent upon consideration of the following detailed description of a specific embodiment thereof, especially when taken in conjunction with the accompanying drawings herein:

The character of the invention is illustrated by:

Fig. 1 which is a view of a single chamber quick acting particulate switch. The arrows indicate the motion required to make and break the circuit, the solid lines showing the "on" position and the broken lines showing the "off" position.

Figure 1:
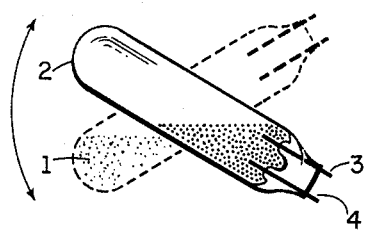
Figure 2:
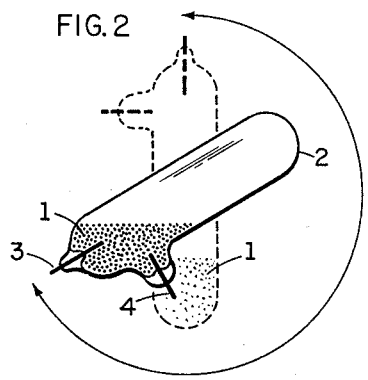
Fig. 2 is a cross section of the switch showing a different distribution of the electrodes.
Figure 3:
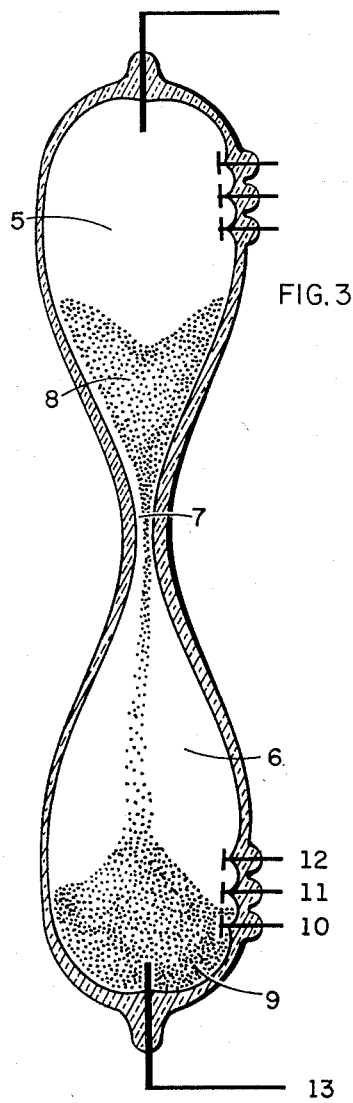
Fig. 3 is a cross section of a two chamber switch showing electrodes in a position resulting in a time delay from the off to the on condition.
Figure 4:
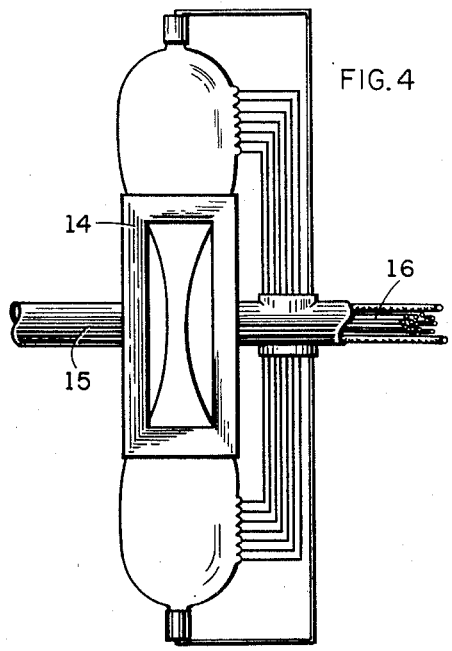
Fig. 4 is a side view of the time delay switch mounted in a cable carrying support.
Figure 5:
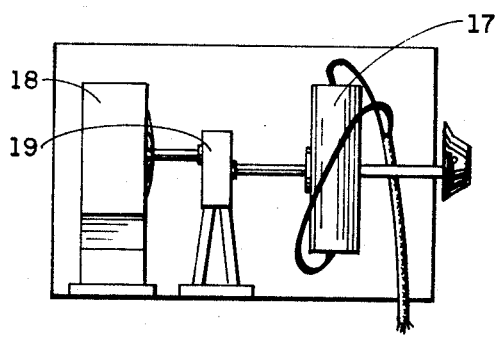
Fig. 5 is a side view of a two chamber switch operated by a servo-control.
Figure 6:
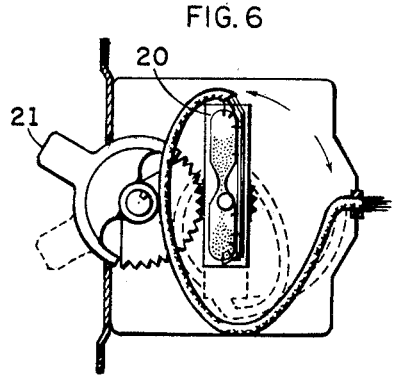
Fig. 6 is a cross sectional side view of a two chamber switch operated by a manual control.
Figure 7:
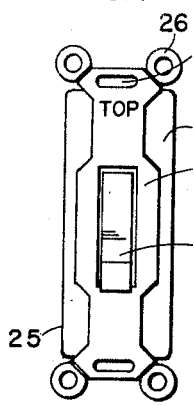
Fig. 7 is a front view of a manually operated single chamber (quick acting) switch.
Figure 8:
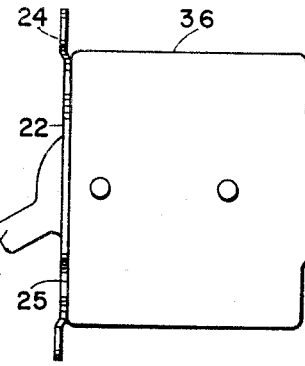
Fig. 8 is a right side view of Fig. 7.
Figure 9:
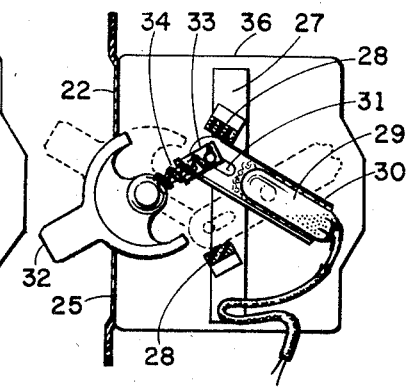
Fig. 9 is a cross sectional side view of Fig. 8.

Referring in detail to the drawing in which the same reference characters indicate like elements in the different views, Fig. 1 illustrates a quick acting particulate switch which comprises a quantity of particulates 1 which are free flowing in a non-conducting container 2 and 3 and 4 are electrodes which communicate between the exterior and the interior of the container. It is seen that in the solid line container the particles 1 surround the electrodes 3 and 4 so that electrical continuity is maintained from electrode to particle to other particles to other electrodes. In the broken line container the electrodes are rotated to a position above the particles thus breaking the electrical connection. Fig. 2 is the same as Fig. 1 except the electrodes 3 and 4 are shown in an alternate location. In Fig. 3 the switch has two chambers 5 and 6 connected by an aperture 7 through which the electrically conducting particles 8 will flow. As the particles 9 accumulate in the lower chamber 6 an electrical circuit will be made as the electrodes 10, 11 and 12 are successively contacted and become electrically connected to the electrode 13. In Fig. 4 the switch is mounted in a frame 14 and the pivoting axle 15 is hollow and forms a conduit for the connecting cables 16. Fig. 5 is an example of a metalicule switch unit 17 connected to a servo-control 18 and a 180° reversing gear 19. Fig. 6 is a manually operated time delay switch embodying the micro-metalicule switch unit 20 showing the pivotal trigger 21 producing a front to back and vice versa movement, as indicated by the arrows. Still another example of the utility of the sphericule type switch is the hand operated immediate acting make and break electrical switch and in referring to Fig. 7 and Fig. 8 a sheet metal mounting strap 22 is fastened across the front of the switch 23, the mounting strap is provided at either end with an enlongated aperture 24 for the reception of screws (not shown) for fastening the switch covering 25 in a conventional switch box 36. The four corners of the strap 22 are provided with mounting ears 26 which are scored so that they may be readily removed and used as washers under certain conditions which are well understood in this art. The arrangement of the switch in the interior of Fig. 7 and Fig. 8 is shown in Fig. 9 where 27 is a vertical plate supporting the rests 28 which limit the motion of the switch unit 29 which is firmly attached inside a hollow tube 30 which is slotted 31 to allow for the pivotal motion of the trigger 32. The extension rod 33 has a spring 34 on it to provide tension in each position. The mounting yoke 35 supports the switch 29 and surrounding tube 30 in its center.

Having described my invention of a new, more effectual and less costly micro-metalicule electric switch, it will be readily appreciated by one skilled in this art that by using the combination of the sand timer principle of time delay and freely flowing electrically conducting particles, I have been able to greatly extend the temperature limitations of electrical switches and several illustrations of their use have been given. As shown by my invention several types of time delays are incorporated into the design of the switch electrodes. The time delay will vary from very small in the immediate acting switch to increasing delay increments as the distance between the electrodes is increased. As additional examples I have shown the embodiment of this switch into a servo-mechanism and a manual delay switch and a manual rapid acting switch. It can be clearly seen that the invention is not a complex device and lends itself to components and simple repair parts.

Modifications of this invention will occur to those skilled in this art and it is to be understood, therefore, that this invention is not limited to the particular embodiment disclosed but that it is intended to cover all modifications which are within the true spirit and scope of this invention.

What I claim as new and desire to secure by Letters Patent of the United States is:

1. A switch element comprising a closed container formed from a non-conductive material and having at least two electrodes passing from the exterior of the container through the container walls into the interior of the container, the container being partially filled with a mass of electrically conductive sphericules approximately spherical in shape and having diameters in excess of 200 microns, said sphericules selected from the groups of metals consisting of copper, silver, gold, platinum, aluminum, columbium, tantalum, tungsten, magnesium, zirconium, beryllium and vanadium; the electrodes being so spaced in relation to the mass of conductive sphericules that when the switch element is rotated and brought to rest with the electrodes at the bottom of the element so rotated, both electrodes are in contact with the mass of conductive sphericules.

2. A switch element comprising a closed container formed from a non-conductive material and shaped so that there is a constriction in the middle leaving an aperture through which electrically conductive particles may flow from the upper chamber to the lower chamber, each chamber having at least one electrode passing from the exterior of the chamber through the side walls of the chamber into the interior of the chamber, intermediate the end of the chamber and the constriction and at least one electrode being located at the end of each chamber, said container being partially filled with electrically conductive sphericules approximately spherical in shape and having diameters in excess of 200 microns selected from the group of metals consisting of copper, silver, gold, platinum, aluminum, columbium, tantalum, tungsten, magnesium, zirconium, beryllium and vanadium, the quantity of said sphericules being less than the quantity required to fill one chamber.

3. The apparatus of claim 1 wherein the conductive particles are formed of a non-conductive support having disposed on this surface a layer of electrically conductive material.

References Cited in the file of this patent

UNITED STATES PATENTS

| 1,997,090 | Turner | Apr. 9, 1935 |
| 2,015,156 | Richmond | Sept. 24, 1935 |
| 2,555,513 | Schweitzer, Jr. | June 5, 1951 |

FOREIGN PATENTS

| 154,503 | Great Britain | Dec. 2, 1920 |